Patented May 5, 1942

2,281,810

UNITED STATES PATENT OFFICE 2,281,810

EARTH CONSOLIDATION

John B. Stone, Tulsa, Okla., and Abraham J. Teplitz, Penn Township, Allegheny County, Pa.; said Stone assignor to The Dow Chemical Company, Midland, Mich., a corporation of Michigan, and said Teplitz assignor to Gulf Research & Development Company, Pittsburgh, Pa., a corporation of Delaware No Drawing. Application January 19, 1940, Serial No. 314,726

14 Claims. (Cl. 61—36)

This invention or discovery relates to earth consolidation and more particularly to consolidating pervious earth formations which surround earth bores; and it comprises a method wherein there is injected into the pores or interstices of earth formations to be consolidated an acid organic-silicate sol in a state of incipient gelation and adapted to set to a gel after an interval of time, the setting time of said sol being controlled by adjustment of the acidity with incorporation in the sol of a polybasic acid characterized by the property of delaying setting of the sol in the presence of calcium carbonate whereby the sol is prevented from setting prematurely; and it further comprises a composition of matter for earth consolidation by injection, comprising a liquid acid organic-silicate sol in a state of incipient gelation containing a polybasic acid characterized by the property of delaying setting of the sol in the presence of calcium carbonate, said acid being present in such amount as to control the setting time of said sol to between ¼ hour and 2 hours in the presence of calcium carbonate; all as more fully hereinafter set forth and as claimed.

Leakage of water into oil and gas wells from porous rock formations surrounding the well is a source of considerable waste, whether it occurs during the drilling of the well or in producing the well after drilling is completed. The difficulties are aggravated when the water-bearing rock is soft and has a tendency to heave or to cave into the well. In the past, water-bearing strata have been shut off from the well by running extra strings of casings, but this expedient is costly and does not work in some cases. Recently there have been developed methods of shutting off water by injection into the porous rock of liquid substances of such character as to solidify in the pores of the rock, thereby sealing the pores against water leakage, and also, if the sealing material has sufficient mechanical strength, hardening or consolidating the rock and preventing heaving and caving. To work well, the agent has to be a fairly thin (low viscosity) liquid, so as to enter cracks and capillary pores, and it must set up in a definite time, neither too long nor too short, into a permanent insoluble solid plug of considerable mechanical strength.

One of the most satisfactory injection methods of water shutoff so far developed involves the injection into the pores of the rock of certain liquid aqueous organic silicates or siliceous sols in a state of incipient gelation, that is, capable of setting to a solid insoluble gel in the course of time. Under certain well conditions these sols will enter the pores of the rock and set therein, consolidating and impermeabilizing the rock. However, despite certain attractive advantages the action of these water shutoff agents is markedly modified by the character of the rock formations into which they are injected, and by the waters or brines in the formations, and they give erratic results in certain oil well situations. When the formations treated or the sludges encountered in a well during treatment are basic or alkaline in nature, as is often the case, the setting time of these silica sols is greatly accelerated, and premature solidification of the sealing agent is apt to take place. The sol may set up within a few seconds upon contact with a limestone formation for example. Thus the utility of these sols has been limited by the nature of the formations to be treated and of the sludges in the well.

We have found, and the discovery is important to the present invention, that fluid mixtures of organic silicates and water vary as to the time required for setting to take place depending on the hydrogen ion concentration or pH of the mixture. The setting times of these acid silica sols in a state of incipient gel formation are also affected by variations in the sol ingredients, in the concentration or relative amount of $SiO_2$ per unit volume and in temperature. In general, as the amount of $SiO_2$ per unit volume is increased, the setting time diminishes; and as the temperature of the sol is increased, the setting time diminishes. However, for an acid organic silica sol of any given composition and concentration, as regards the organic silicate and water components, maintained under uniform temperature conditions, we find that within a certain range of pH values, the time required for the sol to set after preparation will increase sharply from a few minutes to several hours as the pH increases and then, after a certain optimum pH value is reached the setting time of the sol will decrease until a pH is reached at which the sol will again set up almost instantly after preparation.

According to the invention in its best embodiment we first prepare a silica sol by admixing an organic alkyl silicate, e. g., methyl silicate, with water to produce a colloidal siliceous suspension in a state of incipient gelation. An acid, e. g., HCl, is incorporated in the mixture in amount sufficient to give a predetermined pH below 7 (i. e., on the acid side of neutrality) and a predetermined time interval between the mixing of the sol and the setting of the sol (setting time).

We then incorporate in the sol a polybasic acid, which acid is capable of at least temporarily maintaining the pH within the required limits when the sol is brought into contact with limestone or like basic substances occurring in the earth. The sol is then injected into the pores of the earth, under pressure, and pressure is maintained for a while. In due course, production of a dense hydrated silica gel takes place in the rock pores, sealing the rock against passage of water and also strengthening and consolidating the rock. The operation works satisfactorily whatever the character of the rock. Premature or erratic setting is avoided.

Thus, in general, our invention comprises earth consolidation by injection therein of any unstable liquid sol of organic silicate derivation characterized by having a pH value below 7 (i. e., on the acid side of neutrality) and the property of setting to a firm gel after a predetermined interval of time and by having incorporated therein a polybasic acid which is capable of at least temporarily maintaining the sol within a proper acid pH range to prevent premature setting of the sol during the injection period when in contact with limestone or like naturally occurring basic reacting substances.

Among the polybasic acids which we have found suitable to stabilize the pH of the sol within a predetermined range in the presence of limestone are sulfuric acid, the acids of phosphorus, oxalic acid and citric acid. These acids will keep the pH of the sol to a low value long enough to allow the sol to be forced well into the rock pores before it sets. These acids all have a slower rate of reaction with respect to limestone than has HCl.

As the ultimate aim is to produce in situ in the earth a dense, firmly bonded gel of high strength and hardness, we usually employ sols with an $SiO_2$ content as high as possible in keeping with the length of setting time required to inject the sol into the formation to be treated and in keeping with the fluidity and viscosity required to permit pumping of the sol and injection thereof into the pores of the earth. We often employ sols containing upwards of 10 per cent by weight of silica and often as high as 25 per cent. Using such concentrated sols, the maximum setting time usually is obtained when the pH of the sol lies somewhere between 0.5 and 3; the setting time within this range being greater than with higher or lower pH values. When a sol of high concentration is employed, a strong acid is needed to bring the pH near the lower end of that range which affords a substantial interval between the time of preparation of the sol and the setting thereof. Where the maximum setting time obtainable at a given well temperature, say 140° F., is obtained at approximately pH 1.5, but adequate setting times can be obtained between a pH of 0.5 and 3, we usually adjust the pH to about 0.5 in order that any slight neutralization occurring when the sol is brought in contact with limestone will increase rather than decrease the setting time.

Sometimes both the initial adjustment of the pH of the sol and the stabilization of the pH in the presence of limestone can be accomplished by the addition of a suitable polybasic acid alone. However, the various polybasic acids vary in strength over a considerable range, and where the sol must be initially adjusted to a relatively low pH it is sometimes necessary in stabilizing the pH with the weaker of the polybasic acids to employ in conjunction therewith a strong acid to give the sol the proper pH. Thus, while the phosphorus acids may sometimes be used both to adjust and stabilize the pH of the sol, we frequently find it desirable to make the initial adjustment with a stronger acid such as HCl.

The organic polybasic acids of the present invention work most effectively as stabilizers for the sol when the sol contains a strong acid the calcium salt of which is soluble. In using oxalic or citric acid, for example, we initially adjust the pH of the sol to the desired value by the incorporation of hydrochloric acid and stabilize the pH by the addition of the oxalic or citric acid.

While the use of either an inorganic or an organic polybasic acid for stabilizing the pH of an acid organic-silicate sol is within the general purview of our invention, we have discovered that the inorganic acids behave somewhat differently from the organic acids, and among the inorganic polybasic acids the lower hydrates of $P_2O_5$ are unique in their stabilizing effect. Considering the inorganic acids, for instance, when the pH of a sol prepared from methyl or ethyl silicate is properly adjusted and pyro-phosphoric acid ($H_4P_2O_7$) or a lower hydrate of $P_2O_5$ is incorporated therein, the pH of the sol, and likewise the setting time, will remain substantially constant in the presence of large excesses of calcium carbonate over the stoichiometric equivalent required to neutralize all the acid present in solution. This phenomenon is not easily explained, and we content ourselves with observing its existence. However, we have, as stated, only succeeded in obtaining this unique stabilizing effect with the lower hydrates of $P_2O_5$.

The remaining inorganic polybasic acids, such as the higher hydrates of $P_2O_5$ and sulfuric acid, appear to exert a stabilizing effect intermediate that of the lower hydrates of $P_2O_5$ and the organic polybasic acids. For example, when sulfuric acid is employed to stabilize an acid organic-silicate sol, upon addition of a large excess of calcium carbonate to the sol, the pH immediately begins to increase gradually. While the setting time of the sol is somewhat accelerated in the presence of an excess of limestone, a sufficient interval is obtained to afford considerable latitude in injecting the sols into limestone formations.

While the organic polybasic acids do not have all the advantages of the inorganic polybasic acids when employed to stabilize the pH of these acid sols, they are effective in at least temporarily maintaining the pH relatively stable in the presence of calcium carbonate. In contact with amounts of calcium carbonate stoichiometrically equivalent to the organic polybasic acid present, the sols of our invention containing a strong acid, the calcium salt of which is soluble, maintain their pH within the required range for a substantial period. Even when brought in contact with an excess of limestone, the pH will be maintained within a proper range for a short interval sufficient to enable the sol to be injected into a limestone formation under ordinary conditions. In the absence of an organic polybasic acid, the sol would set up instantly.

The acids of phosphorus are many, but all the lower and higher hydrates of $P_2O_3$ and $P_2O_5$ are useful in stabilizing the pH of the sols employed in the present invention. The hydrates of $P_2O_5$, and especially the lower hydrates, are particularly advantageous in preventing rapid and appreciable neutralization of the sols in the presence of a large excess of limestone. For instance, while in time the lower hydrates of $P_2O_5$ may revert to ortho-phosphoric acid when diluted with water, the results obtained with pyrophosphoric acid and lower hydrates of $P_2O_5$ are not obtained by merely adding greater amounts of ortho-phosphoric acid to the equivalent sols. In other words, the lower the hydrate of $P_2O_5$ employed, the more stable the pH in the presence of limestone.

As stated, the strengths of the phosphorus acids vary over a wide range and for one reason or another it is not always expedient to accomplish both the adjustment and stabilization of the pH of any given sol with a phosphorus acid alone. For instance, where it is desirable to initially adjust the pH of the sol to 1 or under, it is usually necessary to adjust the pH of the sol with a stronger acid and then incorporate sufficient of the phosphorus acid to stabilize the pH in the presence of calcium carbonate.

Only a relatively small quantity of the polybasic acid is needed to prevent premature setting occasioned by the acid sols coming in contact with limestone. In water shut-off operations conducted in formations adjacent oil well bores and the like, the sol seldom comes in contact with limestone or other basic substances except during or very shortly before the period required for actual impregnation of the formation to be treated, that is to say, during movement of the sol into the rock. In the usual earth consolidation operation, the time interval is relatively short between the time the sol is first brought into contact with limestone and the time when the injection is complete, hence, the polybasic acid in the sol is only called on to function over a short span of time.

Various alkyl silicates may be used in the preparation of sols according to the invention. Usually these silicates are made by the action of lower alcohols on silicon tetrachloride and, as made, they frequently contain sufficient free hydrochloric acid to furnish the required pH. In such instances, we merely mix the alkyl silicate with water to which has been added sufficient polybasic acid to maintain the sol within the required pH range for an appreciable period in the presence of basic substances such as $CaCO_3$.

The strong acid, e. g., HCl, facilitates mixing of the alkyl silicates with water in the preparation of the sols. The methyl silicates are more readily mixed with water than the silicates formed from higher alcohols, and where the methyl silicate employed in the preparation of the sol does not already contain acid, we find that sulfuric acid and $H_6P_4O_{13}$ or stronger acids of phosphorus are suitable. When the concentration of the sol is such that a phosphorus acid alone can be employed to adjust the pH within the range required to afford a suitable setting time, there is no necessity for using another acid. It should be pointed out, however, that the phosphorus acids are not sufficiently strong to permit preparation of a sol from pure ethyl silicates by mixing with water unless considerable alcohol is present. Sulfuric acid or a stronger acid must be employed.

In practice, we find it advantageous to employ the silicate formed by the action of aqueous alcohols on silicon tetrachloride as their silica content is somewhat higher than the pure alkyl ortho-silicates, and a more concentrated sol can be produced therefrom. In preparing the sol, mixing of the alkyl silicate with water is further facilitated by the presence of some free alcohol.

By way of example, in making up one specific sol according to the invention for use in water shut-off in a well, equal parts by volume of water and a methyl silicate containing about 35 per cent by weight $SiO_2$ were mixed after previously incorporating in the water $H_4P_2O_7$ in amount of 2.0 per cent of the total weight of the mixture. The product was an acid silica sol having a pH of 1.29 and being in a state of incipient gel formation. In the absence of foreign substances and at a temperature of 140° F., a sample of the sol described set to an immobile, strong gel 2 hours, 10 minutes after being produced. To another sample of the sol, immediately after being produced, 2.0 per cent by weight of $CaCO_3$ was added at a temperature of 140° F., and the initial pH reading was 1.70. In the presence of this base the sol set to an immobile gel in 1 hour, 45 minutes.

By way of comparison with the above sol, a plain acid sol prepared in like manner, by mixing equal volumes of the same methyl silicate and water, but without any polybasic acid, had an initial pH value of 1.85 and required 4 hours, 17 minutes to set at a temperature of 140° F. in the absence of foreign substances. However, when 2.0 per cent by weight $CaCO_3$ was added to the unstabilized sol, it set up to a firm gel in 34 seconds. Such a sol would be unsuitable for treating a water-bearing limestone stratum.

Other alkaline substances which are naturally present in earth formations or present in the sludge at the base of a well accelerate the setting time of unstabilized acid silica sols. Thus, even in small quantities, FeS (often occurring in well sludges) will cause an unstabilized acid sol to set up almost instantly. In using the stabilized sols of the present invention this effect is retarded sufficiently to permit injection of the fluid sol into the pores of the earth formations without danger of the sol setting to a gel in the bore or during the injection operation.

As an example of the unique stabilizing effect of the lower hydrates of $P_2O_5$, an acid silica sol was prepared by mixing 10 parts by volume of an ethyl silicate containing 40.0 per cent by weight silica with 2.5 parts by volume methyl alcohol, 0.2 part by volume hydrochloric acid and 12.7 parts by volume water. In one portion of the acid sol so produced 1.0 per cent by weight of $H_6P_4O_{13}$ was incorporated and there was then added 20 per cent by weight precipitated chalk. This portion required 1 hour, 27 minutes to set to a gel, during which interval the pH of the sol remained at approximately 2.5. Another portion of the acid sol having incorporated therein 1.0 per cent of a lower hydrate of $P_2O_5$ produced by adding 1 mol $P_2O_5$ to 1 mol $H_6P_4O_{13}$ required 1 hour, 45 minutes to set when in contact with 20 per cent by weight precipitated chalk, the pH of the stabilized sol remaining substantially constant at around 2.35 during the interval. By way of comparison, a third portion of the sol containing no polybasic acid set to a firm gel in 4 minutes when in contact with only 4 per cent by weight precipitated chalk.

Further tests on additional portions of the same sol showed that incorporation of 1 per cent by weight of $H_4P_2O_7$ delayed the setting time of the sol appreciably when in contact with the same excess of $CaCO_3$, but the setting time was less than 1 hour, and the pH was observed to rise gradually during the interval until a value of approximately 3 was approached at setting time. $H_3PO_4$ and the hydrates of $P_2O_5$ were much less effective in the presence of this large excess of limestone.

Table I below illustrates the effect of various amounts of certain polybasic acids on the setting time of certain acid silica sols in the presence and absence of naturally occurring basic substances such as calcium carbonate.

*Table I*

| Acid sol ingredients | Poly-basic acid (percent by weight of sol) | Alkaline substance (percent by weight of $CaCO_3$ base on sol) | Initial pH | Setting time | | |
|---|---|---|---|---|---|---|
| | | | | Hr. | Min. | Sec. |
| 1 sol "A" | None | None | 1.85 | 4 | 35 | |
| 2 | do | 0.5 | 3.2 | | | 57 |
| 3 | do | 2.0 | 4 | | | 34 |
| 4 | 2.0 $H_3PO_4$ | None | 1.7 | 3 | 20 | |
| 5 | 3.0 $H_3PO_4$ | None | 1.5 | 2 | 50 | |
| 6 | do | 2.0 | 2.32 | 1 | 15 | |
| 7 | 1.0 $H_4P_2O_7$ | None | 1.35 | 3 | 6 | |
| 8 | do | 2.0 | 1.69 | 1 | 21 | |
| 9 | 2.0 $H_4P_2O_7$ | None | 1.29 | 2 | 10 | |
| 10 | do | 2.0 | 1.7 | 1 | 45 | |
| 11 | 2.0 $H_6P_4O_{13}$ | 2.0 | 1.5 | 1 | 22 | |
| 12 | do | 6.0 | 1.6 | 1 | 15 | |
| 13 sol "B" | None | None | 1.48 | 3 | | |
| 14 | do | 4.0 | 4.8 | | | 9 |
| 15 | 1.2 $H_4P_2O_7$ | None | 1.3 | 2 | 20 | |
| 16 | do | 4.0 | 1.7 | 1 | 35 | |
| 17 | do | 8.0 | 1.7 | 1 | | |

In the foregoing table, sol "A" was prepared by mixing neutral methyl silicate containing some free alcohol to facilitate mixing with an equal volume of water to which has been added 0.2 per cent by weight HCl, and sol "B" was prepared by mixing equal volumes of water containing 0.4 per cent HCl and neutral ethyl silicate containing 5 per cent residual alcohol. In the above tabulation, the sols with polybasic acids added, viz., sols Nos. 4 to 12 and 15 to 17, are sols as employed in the present invention for water shut-off and earth consolidation. The plain sols without polybasic acids, viz., Nos. 1, 2, 3, 13 and 14, are put in the tabulation merely by way of comparison.

While the invention has been described with particular reference to the treatment of earth formations surrounding well bores, it is not limited thereto, as the method is useful in any earth impregnation or consolidation process, such as in preparing foundations for buildings, wherein it is desired to inject fluid silica sols into porous rock formations, in the presence of alkaline substances, with the object of forming silica gels in situ in the pores. Likewise, the invention is useful where treatment of earth formations is undertaken without knowledge of the presence or absence of alkaline substances with which the treating fluid may come into contact.

Although for the reasons stated, we often find it advantageous to employ relatively concentrated sols containing high mol ratios of silica to alkali, the invention is not to be taken as limited thereto. Sols of various concentrations and of various compositions may be employed without departing from the scope or spirit of the invention. In general, according to the invention any liquid acid organic-silicate sol in a state of incipient gel formation and adapted to set to a gel after a predetermined interval of time can be stabilized against premature setting up in the presence of calcium carbonate or the like by adjustment of the acidity and incorporation therein of a polybasic acid adapted to temporarily maintain the pH of the sol within predetermined limits in the presence of calcium carbonate.

In general, among the more readily available polybasic acids we find that tetraphosphoric acid ($H_6P_4O_{13}$) is the most effective for stabilizing acid silica sols. Slightly less amounts are required to produce a given stabilizing effect than when employing higher hydrates of $P_2O_5$. However, given amounts of $H_6P_4O_{13}$ when added to acid silica sols reduce the time interval required for setting in the absence of alkalis to a greater extent than equal amounts of some of the other acids. The selection of any particular polybasic acid depends somewhat on the ultimate effect desired. As stated above, in well treatment the stabilizing effect of the polybasic acids is only needed for a very short interval during the total period of treatment. Thus, where a long time is required for handling the sol after preparation and prior to injection into the formation, we find it advantageous to use relatively small amounts of those polybasic acids which reduce the setting time in the absence of alkalis to a less extent than $H_6P_4O_{13}$.

In Table II below a comparison is afforded of the effect of different polybasic acids on standard 125 cc. samples of an acid methyl silicate sol prepared by mixing equal volumes of water and a reaction product of silicon tetrachloride and methyl alcohol in the presence of about 10 per cent free alcohol. The amount of each polybasic acid added was chosen to produce an equivalent of available hydrogen with respect to the other acids.

*Table II*

| Polybasic acid in gms. | Gms. $CaCO_3$ | Effect of addition of $CaCO_3$ on pH | | pH at setting time | Setting time | |
|---|---|---|---|---|---|---|
| | | Before | After | | Hr. | Min. |
| None | None | 1.85 | | 2.00 | 4 | 35 |
| Do | 2.5 | 1.85 | 4.00 | 4.00 | 0 | (Less than .01). |
| Citric 3.595 | 2.5 | 1.80 | 2.93 | 3.08 | | 22 |
| Oxalic 2.53 | 2.5 | 1.57 | 1.60 | 1.38 | 1 | 33 |
| Sulfuric 2.752 | 2.5 | .94 | .96 | .9 | 0 | 55 |
| $H_4P_2O_7$ 2.5 | 2.5 | 1.29 | 1.70 | 1.75 | 1 | 40 |
| Do | 5.0 | 1.52 | 1.89 | 2.7 | 1 | 10 |
| Do | 7.5 | 1.4 | 1.79 | 3.0 | 0 | 50 |
| $H_6P_4O_{13}$ 3.168 | 7.5 | 1.09 | 1.6 | 1.74 | 1 | 17 |

It will be noted that when the pH of the sol approaches a value of 3 or over, the setting time becomes very rapid. During determination of pH there is some evaporation of alcohol, and this accounts for the fact that in some instances the pH is actually lower at setting time. According to the invention, the acidity of the concentrated sols is ordinarily adjusted to a pH value between 0.5 and 3.0 and a poly-basic acid is added which will temporarily maintain the acidity below pH 3 in the presence of alkalis. The sols employed in the invention can usually be ranked as highly acid sols.

The invention is particularly useful in the treatment of earth formations surrounding deep well bores to plug the bore spaces by depositing therein a firmly bonded, strong silica gel. Using the method of the invention a stabilized acid silica sol is prepared which will set up only after a certain predetermined interval whether in the presence of alkaline substances or not. Usually a sol is prepared which will set up in between 1½ hours and 2 hours in the absence of alkalis. This affords ample time to introduce the sol into the well and thence to the formation to be treated. The interval is not long, however, between the time injection is completed and the gel is firmly set, and thus the drilling or production operations are not suspended long. Immediately after preparation, the fluid sol of the invention is introduced down the well and thence in known manner to the formation to be plugged or consolidated. Usually the injection is carried out under pressure, by a loading liquid column, and after the total body of sol has been injected into the formation, the pressure is maintained until sufficient time has elapsed to insure that the sol has been transformed into a gel in situ when the pressure is released and the treatment is complete. Should the well being treated have an oil-bearing stratum which it is desired to protect from the action of the plugging agent, this can conveniently be done in the manner set forth in the Kennedy & Wescott Patent No. 2,104,488.

In the foregoing specification we have described in particular the stabilization of acid organic-silicate sols by incorporation therein of polybasic acids as such but, without departing from the purview of the invention, the polybasic acid may be incorporated in the sol in the form of a salt containing the polybasic acid radical, provided, of course, the pH of the sol is maintained within proper limits to afford a suitable setting time. Usually where the polybasic acid is incorporated in the form of its salt, we provide an excess of HCl in the sol to neutralize the metal ion of the salt.

While the invention has been described primarily with reference to sols of organic-silicate origin, some of the stabilizing agents, viz., the acids of phosphorus, oxalic and citric acids, stabilize inorganic silica sols, such as those made by mixing a sodium silicate, HCl and water. Though the behavior of acid sols made from organic silicates and water is in general different from that of sols made from sodium silicate and acid, these stabilizing agents delay gelation of these inorganic sols in the presence of limestone, etc. and are useful in connection therewith.

While the invention will be readily understood by the foregoing description, it is not to be taken as limited thereby, as many modifications within the scope of the appended claims will be apparent to those skilled in the art. In the specification and claims "rock" is used in the geological sense, as including packed sand, clays, etc., as well as hard rock. The invention is not restricted to sealing porous rock around oil wells. It is useful in earth consolidation and impregnation of porous or pervious substances of alkaline reaction where similar problems arise. For example, the invention can be applied with advantage to sealing or consolidating weak calcareous sandstones adjacent building foundations or to sealing porous Portland cement structures. In such utilization the sol prepared as described is injected into the rock, etc., under pressure through pipes or the like, in ways known per se.

What we claim is:

1. A liquid acid aqueous silica sol derived from the hydrolysis of an organic silicon compound and containing a polybasic acid of such character and in such amount as to delay the setting of the sol in the presence of calcium carbonate to between ¼ hour and 2 hours from the time of preparation of the sol.

2. A liquid acid aqueous silica sol derived from the hydrolysis of an organic silicon compound, in a state of incipient gelation and containing at least 10 per cent by weight $SiO_2$, said sol being stabilized against premature setting on coming in contact with calcium carbonate by incorporation therein of a polybasic acid characterized by the property of delaying setting of the sol in the presence of calcium carbonate.

3. As a new composition of matter a liquid acid aqueous silica sol in a state of incipient gelation, said sol being derived from hydrolysis of an organic silicon compound, and containing at least 10 per cent by weight silica and containing a small amount of a polybasic acid characterized by the property of delaying setting of the sol in the presence of calcium carbonate, said polybasic acid being incorporated in such amount as to fix the setting time of said sol at between ¼ hour and 2 hours in the presence of calcium carbonate.

4. A liquid aqueous acid silica sol containing at least 10 per cent $SiO_2$ by weight and having a pH between 0.5 and 3, said sol being derived by hydrolysis of an alkyl silicate and containing a phosphorus acid and having a setting time of between ¼ hour and 2 hours when in contact with $CaCO_3$.

5. The sol of claim 4 wherein said phosphorus acid is selected from the class of $H_4P_2O_7$ and lower hydrates of $P_2O_5$.

6. A method of solidifying permeable substances of alkaline reaction which comprises injecting into the substance under pressure a liquid aqueous acid silica sol derived from hydrolysis of an organic silicate, in a state of incipient gelation and having a predetermined setting time of between approximately ¼ hour and 2 hours in the presence of calcium carbonate.

7. A method of earth consolidation which comprises injecting into the pores of an earth formation an acid aqueous silica sol derived from an organic silicate by hydrolysis, in a state of incipient gelation and containing a polybasic acid characterized by the property of preventing rapid variation in pH of the sol when in contact with limestone.

8. The method of claim 7 wherein the sol comprises methyl silicate mixed with water.

9. The method of claim 7 wherein said earth formation is adjacent a deep well.

10. The method of claim 7 wherein said earth formation is a water-bearing formation adjacent a well bore, whereby the resulting earth consolidation diminishes infiltration of water into said well from said formation.

11. In the art of earth consolidation, the improvement which comprises the steps of establishing an acid liquid aqueous sol obtained from the hydrolysis of an organic silicon compound, in a state of incipient gelation and having a setting time which varies with variation in pH of the sol, incorporating in the sol a polybasic acid characterized by the property of delaying variation in pH of the sol in the presence of calcium carbonate, adjusting the pH of the sol within such limits as to control the setting time of the sol to between ¼ hour and 2 hours in the presence of calcium carbonate and introducing said sol into an earth formation to be consolidated prior to setting of the sol.

12. A process of earth consolidation which comprises establishing an acid fluent aqueous silica sol derived from hydrolysis of an organic silicon compound, in a state of incipient gelation and having a characteristic interval between the time of establishment of the sol and the time of gelation thereof determined at least in part by the pH of the sol, the pH of the sol being adjusted to such a value as to afford a substantial interval before gelation and the sol having incorporated therein a small amount of a polybasic acid capable of maintaining the pH of the sol within predetermined limits for a substantial interval in the presence of calcium carbonate, injecting said fluid sol prior to gelation into the pores and cracks of an earth formation to be consolidated and permitting the sol to gel in situ in said formation.

13. A method of consolidating rock which comprises injecting therein an acidic aqueous siliceous sol obtained by hydrolysis of an organic silicon compound, in liquid condition capable of setting to a solid gel and containing a polybasic acid adapted to prevent setting of the gel before lapse of a predetermined interval of time in the presence of basic substances associated with the rock.

14. A method of sealing permeable rock which comprises injecting therein a fluent, aqueous acidic siliceous sol in a state of incipient gelation, and containing a small amount of a polybasic acid selected from the class consisting of the acids of phosphorus, oxalic acid and citric acid, to prevent premature gelation of the sol in contact with basic substances associated with the rock.

JOHN B. STONE.
ABRAHAM J. TEPLITZ.